US012078962B2

(12) United States Patent
Sano et al.

(10) Patent No.: US 12,078,962 B2
(45) Date of Patent: Sep. 3, 2024

(54) TONER

(71) Applicant: CANON KABUSHIKI KAISHA, Tokyo (JP)

(72) Inventors: Tomohisa Sano, Shizuoka (JP); Kazuyuki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 17/377,488

(22) Filed: Jul. 16, 2021

(65) Prior Publication Data

US 2022/0026823 A1 Jan. 27, 2022

(30) Foreign Application Priority Data

Jul. 22, 2020 (JP) ................................. 2020-125110

(51) Int. Cl.
*G03G 9/093* (2006.01)

(52) U.S. Cl.
CPC ..... *G03G 9/09378* (2013.01); *G03G 9/09371* (2013.01)

(58) Field of Classification Search
CPC ....................... G03G 9/09378; G03G 9/09371
See application file for complete search history.

(56) References Cited

U.S. PATENT DOCUMENTS 6,309,788 B1 10/2001 Tsuji
6,953,648 B2 10/2005 Tsujino
7,123,862 B2 10/2006 Hasegawa et al.
7,494,758 B2 2/2009 Tsujino
7,582,401 B2 9/2009 Ogawa et al.
7,678,523 B2 3/2010 Hiroko et al.
7,678,524 B2 3/2010 Hasegawa et al.
7,923,190 B2 4/2011 Magome et al.
7,935,467 B2 5/2011 Dojo et al.
8,227,162 B2 7/2012 Sano et al.
8,426,091 B2 4/2013 Magome et al.
8,426,094 B2 4/2013 Magome et al.
8,440,382 B2 5/2013 Isono
8,497,054 B2 7/2013 Sugiyama
8,518,620 B2 8/2013 Dojo et al.
8,545,133 B2 10/2013 Fumita
(Continued)

FOREIGN PATENT DOCUMENTS

JP 2005-107182 A 4/2005
JP 2005107182 A * 4/2005
(Continued)

OTHER PUBLICATIONS

English machine translation of the description of JP-2005107182-A (Year: 2005).*
(Continued)

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle comprising a core particle comprising a binder resin and a diester wax, and a shell on a surface of the core particle, wherein the following formulas (1) and (2) are satisfied, where Sp is a partition coefficient of the shell and Wp is a partition coefficient of the diester wax:

$$Sp \leq 0.40 \quad (1), \text{ and}$$

$$16.00 \leq Wp - Sp \leq 20.00 \quad (2).$$

11 Claims, 1 Drawing Sheet

(56) References Cited

U.S. PATENT DOCUMENTS

| | | | | |
|---|---|---|---|---|
| 8,614,044 | B2 | 12/2013 | Matsui et al. | |
| 8,652,725 | B2 | 2/2014 | Watanabe | |
| 8,652,737 | B2 | 2/2014 | Handa | |
| 8,778,581 | B2 | 7/2014 | Nonaka | |
| 8,778,585 | B2 | 7/2014 | Matsui et al. | |
| 8,841,054 | B2 | 9/2014 | Dojo et al. | |
| 8,916,319 | B2 | 12/2014 | Ikeda | |
| 8,940,467 | B2 | 1/2015 | Hashimoto | |
| 9,152,065 | B2 | 10/2015 | Sano et al. | |
| 9,229,345 | B2 | 1/2016 | Ikeda | |
| 9,235,151 | B2 | 1/2016 | Tanaka et al. | |
| 9,341,967 | B2 | 5/2016 | Tsujino | |
| 9,354,534 | B2 * | 5/2016 | Okada | G03G 9/09314 |
| 9,366,981 | B2 | 6/2016 | Yamawaki | |
| 9,377,708 | B2 | 6/2016 | Magome et al. | |
| 9,551,947 | B2 | 1/2017 | Hiroko et al. | |
| 9,632,441 | B2 | 4/2017 | Abe | |
| 9,658,551 | B2 | 5/2017 | Terui | |
| 9,785,077 | B2 | 10/2017 | Abe | |
| 9,804,514 | B2 | 10/2017 | Suzumura et al. | |
| 9,804,519 | B2 | 10/2017 | Suzumura et al. | |
| 9,829,814 | B2 | 11/2017 | Yoshida | |
| 9,841,692 | B2 | 12/2017 | Hasegawa et al. | |
| 9,857,711 | B2 | 1/2018 | Yoshida | |
| 9,927,728 | B2 | 3/2018 | Arimura et al. | |
| 9,946,179 | B2 | 4/2018 | Arimura et al. | |
| 9,946,181 | B2 | 4/2018 | Hasegawa et al. | |
| 9,964,874 | B2 | 5/2018 | Suzumura et al. | |
| 9,964,879 | B2 | 5/2018 | Terui | |
| 9,964,881 | B2 | 5/2018 | Ikejiri et al. | |
| 9,971,262 | B2 | 5/2018 | Hasegawa et al. | |
| 9,971,264 | B2 | 5/2018 | Sano et al. | |
| 10,012,922 | B2 | 7/2018 | Yoshida | |
| 10,012,923 | B2 | 7/2018 | Sano et al. | |
| 10,078,285 | B2 | 9/2018 | Kubo | |
| 10,151,990 | B2 | 12/2018 | Suzuki et al. | |
| 10,228,627 | B2 | 3/2019 | Nagashima et al. | |
| 10,295,920 | B2 | 5/2019 | Nishikawa et al. | |
| 10,295,922 | B2 | 5/2019 | Terui | |
| 10,303,075 | B2 | 5/2019 | Tanaka et al. | |
| 10,310,397 | B2 | 6/2019 | Sano et al. | |
| 10,545,420 | B2 | 1/2020 | Kinumatsu et al. | |
| 10,678,155 | B2 | 6/2020 | Terui | |
| 10,698,327 | B2 | 6/2020 | Nagashima et al. | |
| 10,747,133 | B2 | 8/2020 | Yagi | |
| 10,747,136 | B2 | 8/2020 | Kenmoku | |
| 10,852,650 | B2 | 12/2020 | Inoue | |
| 11,079,695 | B2 | 8/2021 | Sato et al. | |
| 11,099,493 | B2 | 8/2021 | Komiya et al. | |
| 11,112,710 | B2 | 9/2021 | Amano | |
| 11,112,714 | B2 | 9/2021 | Amano | |
| 11,599,035 | B2 | 3/2023 | Terui | |
| 2005/0209364 | A1 | 9/2005 | Yamagishi et al. | |
| 2006/0093942 | A1 | 5/2006 | Elda | |
| 2006/0121379 | A1 | 6/2006 | Dojo et al. | |
| 2009/0197192 | A1 | 8/2009 | Hiroko et al. | |
| 2012/0258395 | A1 | 10/2012 | Tanaka | |
| 2012/0264048 | A1 * | 10/2012 | Ishikawa | G03G 9/0825 430/124.1 |
| 2013/0164671 | A1 | 6/2013 | Matsui | |
| 2013/0273465 | A1 | 10/2013 | Tanaka | |
| 2014/0038097 | A1 | 2/2014 | Tanaka | |
| 2014/0205944 | A1 | 7/2014 | Masuda | |
| 2015/0024320 | A1 | 1/2015 | Tanaka | |
| 2015/0212445 | A1 * | 7/2015 | Terasaki | G03G 9/08755 430/110.2 |
| 2016/0349648 | A1 | 12/2016 | Miyamoto | |
| 2016/0378003 | A1 | 12/2016 | Arimura et al. | |
| 2017/0010552 | A1 * | 1/2017 | Sumioka | G03G 9/0821 |
| 2019/0137901 | A1 * | 5/2019 | Shimano | G03G 9/08711 |
| 2020/0379363 | A1 | 12/2020 | Nagaoka et al. | |
| 2021/0063901 | A1 | 3/2021 | Terui | |
| 2021/0063902 | A1 | 3/2021 | Inoue | |
| 2021/0382406 | A1 | 12/2021 | Yamashita | |
| 2022/0026823 | A1 | 1/2022 | Sano | |

FOREIGN PATENT DOCUMENTS

| | | | |
|---|---|---|---|
| JP | 2009-134079 | A | 6/2009 |
| JP | 2015-22237 | A | 2/2015 |
| JP | 2018-4748 | A | 1/2018 |
| JP | 2019-128434 | A | 8/2019 |
| WO | 2013/047296 | A1 | 4/2013 |

OTHER PUBLICATIONS

Johann Gasteiger et al., Iterative Partial Equalization of Orbital Electronegativity—A Rapid Access to Atomic Charges, Tetrahedron, 1980, pp. 3219-3228, vol. 36, Pergamon Press Ltd.

Advanced Chemistry Development (ACD/Labs) Software VII.02 (1994-2016), https://www.americanpharmaceuticalreview.com/106475-ACD-Labs/ (discussed at specification p. 6).

U.S. Appl. No. 17/377,510, filed Jul. 16, 2021, Kazuyuki Sato.

* cited by examiner (FRONT SIDE)
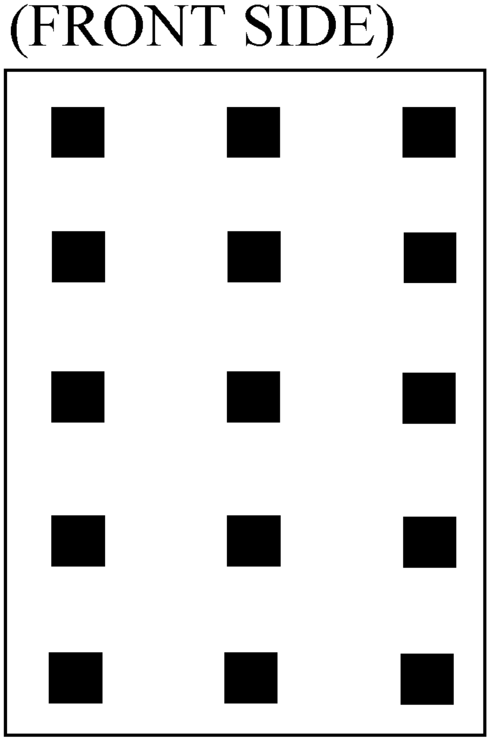
(BACK SIDE)
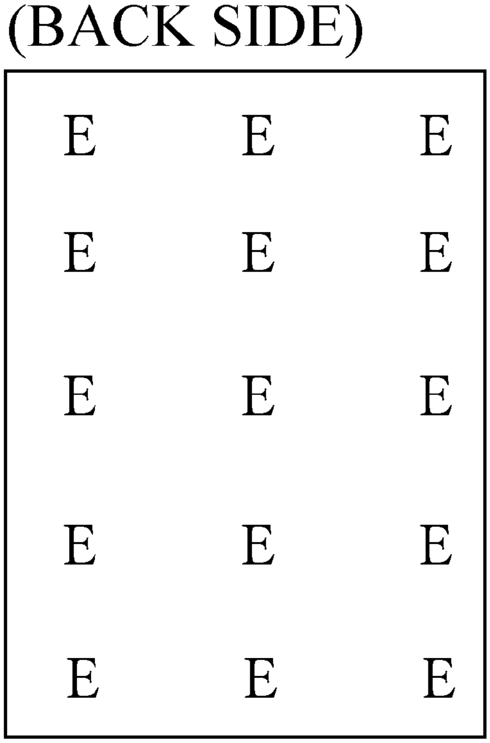

TONER

BACKGROUND OF THE INVENTION

Field of the Invention

The present disclosure relates to the toner used in image-forming apparatuses, for example, copiers, printers, and facsimile machines, that use an electrophotographic system or an electrostatic recording system.

Description of the Related Art

A number of methods are known for the implementation of electrophotography. In general, using a photoconductive material, an electrical latent image is first formed on a photosensitive member by any of various means and the electrical latent image is then rendered into a visible image by development using a toner. The toner image is transferred to a transfer material, e.g., paper, and the toner image on the transfer material is subsequently fixed by the application of, e.g., heat and pressure, to yield a fixed image. The toner that does not transfer to the transfer material during transfer and thus remains on the photosensitive member is cleaned by any of various methods. Lower power consumptions and additional increases in image quality have been required of copiers and laser beam printers in recent years. In order to respond to the demand for lower power consumption, a toner that exhibits an excellent low-temperature fixability is desired, i.e., a toner that melts rapidly at a lower temperature.

In addition, it is frequently the case with printers that jobs for a plurality of users are output at the same time, and the output printed material may then be stacked and may be allowed to stand for some period of time. Immediately after printing, the printed material exhibits a high temperature and the printed toner may stick to paper with which it is in contact, and toner is desired for which such discharged paper sticking does not occur. Investigations have been carried out into the use of wax in toner in order to obtain toner having an excellent low-temperature fixability.

Wax is added with the goals of imparting releasability and providing the binder resin with plasticity. Within this sphere, various investigations have been carried out into ester waxes as waxes that provide an excellent plasticity. For example, WO 2013/047296 proposes a toner that uses a diester compound as the wax and has an improved low-temperature fixability, hot offset resistance, and heat-resistant storability. Japanese Patent Application Laid-open No. 2015-022237 proposes an art in which, by using a thermosetting resin for the shell resin on the toner, the low-temperature fixability is made to coexist with stress resistance.

SUMMARY OF THE INVENTION

However, while WO 2013/047296 does have an effect with regard to improving the low-temperature fixability, there is still room for improvement here with regard to adherence to the fixing film and discharged paper sticking.

The diester compound does exhibit a high compatibility with the binder resin, but a decline in the releasability from the fixing film readily occurs due to a tendency for phase separation from the resin to decline. In addition, because the releasability from paper also declines at the same time, there is a tendency for the occurrence of the aforementioned discharged paper sticking to also be facilitated.

Japanese Patent Application Laid-open No. 2015-022237 does have an effect with regard to durability and low-temperature fixability, but does not discuss fixing film contamination and discharged paper sticking and room for improvement thus remains.

As indicated in the preceding, room for improvement remains with regard to providing a suppression of fixing film contamination in combination with a suppression of discharged paper sticking, and doing this while having an excellent fixing performance. The present disclosure provides a toner that exhibits an excellent fixing performance and that can suppress fixing film contamination and discharged paper sticking.

The present disclosure relates to a toner comprising a toner particle comprising a core particle comprising a binder resin and a diester wax, and a shell on a surface of the core particle, wherein the following formulas (1) and (2) are satisfied, where Sp is a partition coefficient of the shell and Wp is a partition coefficient of the diester wax:

$$Sp \leq 0.40 \quad (1), \text{ and}$$

$$16.00 \leq Wp - Sp \leq 20.00 \quad (2).$$

The present disclosure can provide a toner that exhibits an excellent fixing performance and that can suppress fixing film contamination and discharged paper sticking. Further features of the present invention will become apparent from the following description of exemplary embodiments with reference to the attached drawings.

BRIEF DESCRIPTION OF THE DRAWINGS

The FIGURE is an example of the chart used in the evaluations.

DESCRIPTION OF THE EMBODIMENTS

Unless specifically indicated otherwise, the expressions “from XX to YY” and “XX to YY” that show numerical value ranges refer to numerical value ranges that include the lower limit and upper limit that are the end points. When numerical value ranges are provided in stages, the upper limits and lower limits of the individual numerical value ranges may be combined in any combination.

The present inventors carried out intensive investigations into toner that would exhibit an excellent fixing performance and that could provide a suppression of fixing film contamination and discharged paper sticking. Considering fixing film contamination, the present inventors returned to the thermal fixing process in the first place and carried out investigations. In the thermal fixing process, the unfixed toner loaded on the paper is melted under the application of heat and pressure and wets out. In addition, the crystalline material, e.g., wax, exudes to the toner particle surface and toner-to-toner bonding may also occur.

In order to improve the fixing performance, it is important that a strong paper-to-toner connection and toner-to-toner connection be rapidly established and that releasability between the paper and fixing member, e.g., a fixing film, be exhibited.

The wax exercises substantial influence on improving the fixing film contamination and discharged paper sticking and also on improving the fixing performance, and the present inventors carried out investigations focusing in particular on the types of wax. During these investigations, polar group-bearing ester waxes were advantageous from the standpoint of the fixing performance, and among these diester waxes were excellent.

The present inventors carried out investigations presuming the use of diester wax. Diester waxes exhibit an excellent compatibility with binder resins, and due to this the wax exuded to the toner particle surface during thermal fixing readily maintains a compatible state; conversely, the expression of releasability tends to be impaired. As a result, it was found that there is some adhesion to the fixing member, e.g., the fixing film, and the occurrence of member contamination is facilitated, and that it is thus difficult for the fixing performance to coexist with a suppression of film contamination.

Discharged paper sticking, on the other hand, will now be considered in detail. The state of the toner on a printed image will be considered first. For up to several minutes after the printed material has been discharged, the printed material has a temperature of several tens of ° C. At this time, when the toner on the printed material is in simply a plastic state, the toner is in a semi-melted state and as such exhibits adhesiveness for paper. When, in this semi-melted state, contact with another sheet of paper occurs and pressure may also be applied, the toner may end up adhering to some extent to the additional sheet of paper.

In order to suppress this discharged paper sticking, it is important to raise the viscosity of the softened toner after discharge and to enhance the releasability of the semi-melted toner from paper. However, there is a trade-off relationship with the fixing performance in either instance and coexistence is thus problematic.

As a result of intensive investigations here, the present inventors discovered that the aforementioned problem can be solved by adjusting the relationship between the partition coefficients of the shell layer of the toner and the diester wax into a certain range.

That is, the present disclosure relates to a toner comprising a toner particle that comprises a core particle containing a binder resin and a diester wax and that comprises a shell on the surface of the core particle, wherein the following formulas (1) and (2) are satisfied where Sp is the partition coefficient of the shell and Wp is the partition coefficient of the diester wax.

$$Sp \leq 0.40 \quad (1)$$

$$16.00 \leq Wp - Sp \leq 20.00 \quad (2)$$

The investigations were carried out using partition coefficients calculated from the Gasteiger charge as calculated according to the following reference. Iterative partial equalization of orbital electronegativity—a rapid access to atomic charges, Tetrahedron 1980, 36, 3219.

The partition coefficient is an index that generally represents the hydrophobicity or migration behavior of a chemical substance. It may also be acquired experimentally, but in the present disclosure the octanol/water partition coefficient is obtained by calculation.

The calculation is specifically performed using the following procedure.

Specifically, the partial charge and partition coefficient can be calculated using Advanced Chemistry Development (ACD/Labs) Software V11.02 (c1994-2016, ACD/Labs).

Here, small values for the partition coefficient indicate a low hydrophobicity, i.e., the presence of hydrophilicity. Formula (1) indicates that the shell is hydrophilic, while formula (2) indicates that the difference between the hydrophobicities of the wax and shell are in a certain range.

The present inventors hold as follows with regard to the reasons why the fixing film contamination and discharged paper sticking are improved when formulas (1) and (2) are simultaneously satisfied.

When formulas (1) and (2) are satisfied, the shell and wax undergo phase separation at the toner particle surface when the diester wax exudes to the toner particle surface during thermal fixing; the wax then forms droplets and an excellent releasability is exhibited and the fixing film contamination is substantially improved as a result.

Due to the presence of wax droplets at the toner particle surface, not only is the releasability high, but crystallization post-thermal fixing also proceeds rapidly. As a consequence, by quickly providing a wax-like state, when the printed material is loaded, the releasability with another sheet of paper is substantially raised and the discharged paper sticking is substantially improved.

When Sp in formula (1) exceeds 0.40, the shell tilts to hydrophobicity. Due to this, the shell and the wax exuded during thermal fixing readily become compatible and the releasability declines as a result, facilitating the occurrence of both fixing film contamination and discharged paper sticking.

Sp is preferably less than or equal to 0.10 and is more preferably less than or equal to 0.05. The lower limit for Sp is preferably greater than or equal to −0.10 and more preferably greater than or equal to −0.05.

When Wp−Sp in formula (2) is less than 16.00, the wax and shell readily intermingle and wax droplet formation at the toner particle surface is impeded, and due to this the occurrence of fixing film contamination and discharged paper sticking is facilitated.

When Wp−Sp exceeds 20.00, the shell engages in almost no intermingling with the wax and has a strong blocking effect. Due to this, even the wax that exudes during thermal fixing ends up being blocked and the fixing performance undergoes a large decline.

Wp−Sp is preferably 16.00 to 19.00 and is more preferably 16.00 to 17.00.

The partition coefficients of the shell, wax, and binder resin can be controlled through adjustment of the molecular structure. Specifically, the numerical value declines when the highly polar functional groups (for example, sulfonic acid, amino group, hydroxyl group, carboxy group, and so forth) in each molecule are increased. The selection of a material having a suitable polarity for the material of the shell is preferred in order to secure a suitable hygroscopicity and in order to prevent the occurrence of regions with a locally impaired affinity with the wax. Adjustment using the amino group is particularly preferred for the shell.

The shell used for the toner should be able to satisfy formulas (1) and (2), but is not otherwise particularly limited, and known resin components, e.g., thermosetting resins, thermoplastic resins, and so forth, can be used.

The shell preferably contains a thermosetting resin and more preferably is a thermosetting resin. When the shell contains a thermosetting resin, a high elasticity can be retained even when the wax exudes and the releasability is further increased.

In addition, the shell preferably contains a crosslinking component. Specifically, the content in the shell of matter insoluble in tetrahydrofuran is preferably from 5 mass % to 95 mass %. Securing the aforementioned elasticity-retention effect and securing a balance with the fixing performance are facilitated by having the content be in the indicated range, which is thus preferred. From 10 mass % to 90 mass % is more preferred, and from 50 mass % to 80 mass % is more preferred.

The matter in the shell that is insoluble in tetrahydrofuran (THF) can be analyzed as follows.

First, the composition of the core and shell is measured by surface analysis, e.g., TOF-SIMS, or pyrolysis GC/MS. This is followed by dissolution of the toner in tetrahydrofuran to obtain a soluble resin component and an insoluble resin component. When a component insoluble in tetrahydrofuran, such as magnetite or silica fine particles, in present, separation is performed using, e.g., centrifugal separation, magnetism, and so forth. The ratio in the toner of the insoluble resin component is recorded when this is done.

Since this THF-insoluble resin component contains both a shell-derived component and a binder resin-derived component, the component ratio for the shell and binder resin is elucidated using analytic instrumentation such as pyrolysis GC/MS. The content of THF-insoluble matter in the shell can be obtained from the ratio of the shell, the amount of THF-insoluble matter, and the component ratio of the shell in the THF-insoluble matter, for the analyzed toner.

Favorable examples of the thermosetting resin are melamine resins, urea resins, and glyoxal resins. The thermosetting resin is preferably at least one selected from melamine resin and urea resin. It more preferably is melamine resin.

Melamine resin is a polycondensate of melamine and formaldehyde, and the monomer used to form melamine resin is melamine. Melamine is easily established as the shell at the toner particle surface and is poorly compatible with the diester wax and facilitates the appearance of releasability, and as a consequence achieving the effects indicated above is facilitated.

The melamine-type resin is preferably a methylolmelamine resin, hexamethylolmelamine resin, or methoxymethylolmelamine resin.

Methylolated urea resin is preferred for the urea resin.

The melting point of the diester wax is preferably 65° C. to 85° C. and more preferably 70° C. to 80° C. The toner exhibits an excellent fixing performance when this range is satisfied.

Examples of diester waxes are esters between a dicarboxylic acid and a monoalcohol and esters between a diol and a monocarboxylic acid.

The diol can be exemplified by 1,6-hexanediol, 1,7-heptanediol, 1,8-octanediol, 1,9-nonanediol, 1,10-decanediol, 1,11-undecanediol, and 1,12-dodecanediol.

The dicarboxylic acid can be exemplified by adipic acid, pimelic acid, suberic acid, azelaic acid, decanedioic acid, undecanedioic acid, and dodecanedioic acid.

Straight-chain fatty acids and straight-chain alcohols are provided here as examples, but branched structures may be present.

Aliphatic monoalcohols are preferred for the monoalcohol for condensation with the dicarboxylic acid. Specific examples are tetradecanol, pentadecanol, hexadecanol, heptadecanol, octadecanol, nonadecanol, eicosanol, docosanol, tricosanol, tetracosanol, pentacosanol, hexacosanol, and octacosanol. Docosanol is preferred among the preceding from the standpoints of fixing performance and developing performance.

Aliphatic monocarboxylic acids are preferred for the monocarboxylic acid for condensation with the diol. Specific examples are fatty acids such as lauric acid, myristic acid, palmitic acid, margaric acid, stearic acid, tuberculostearic acid, arachidic acid, behenic acid, lignoceric acid, and cerotic acid. Stearic acid and behenic acid are preferred among the preceding from the standpoints of fixing performance and developing performance.

The diester wax preferably is a compound given by the following formula (A).

(A)

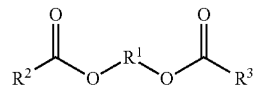

In formula (A), $R^1$ represents an alkylene group having from 2 to 12 (preferably from 2 to 8 and more preferably from 2 to 4) carbons. $R^2$ and $R^3$ represent a straight-chain alkyl group having from 15 to 25 (preferably from 16 to 22 and more preferably from 16 to 20) carbons, and $R^2$ and $R^3$ are independent from each other.

The diol that provides the substructure given in formula (A) can be exemplified by ethylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol.

Ethylene glycol and 1,9-nonanediol are preferred among the preceding, with ethylene glycol, in which $R^1$ is an alkylene group having 2 carbons, i.e., the ethylene group, being more preferred from the standpoints of compatibility with the binder resin and ease of exudation during heat fixing.

Aliphatic monocarboxylic acids are preferred for the monocarboxylic acid for condensation with the diol. Specific examples are fatty acids such as lauric acid, myristic acid, palmitic acid, margaric acid, stearic acid, tuberculostearic acid, arachidic acid, behenic acid, lignoceric acid, and cerotic acid. Stearic acid and behenic acid are preferred among the preceding from the standpoints of fixing performance and developing performance.

The diester wax preferably contains a compound with formula (A) as its main component. "Main component" denotes a content greater than or equal to 50 mass %. The content of the diester compound with formula (A) in the diester wax is more preferably from 95 mass % to 100 mass %.

The content of the diester wax is preferably from 2 mass parts to 30 mass parts per 100 mass parts of the binder resin. From 4 mass parts to 25 mass parts is more preferred, from 5 mass parts to 22 mass parts is still more preferred, and from 10 mass parts to 22 mass parts is even more preferred.

The melting point of the diester wax is preferably from 60° C. to 90° C. and more preferably from 65° C. to 80° C. The suppression of discharged paper sticking is facilitated at greater than or equal to 65° C., while the prevention of fixing film contamination is facilitated at less than or equal to 90° C.

The toner particle may contain, in addition to the diester wax, another known wax to a degree that does not impair the effects indicated above.

For example, a paraffin wax may be used as the wax. The content of this other wax is preferably from 1 mass parts to 20 mass parts per 100 mass parts of the binder resin.

A specific example of the production of the diester wax with formula (A) is provided in the following.

The alcohol and carboxylic acid starting materials are first added to a reactor. The molar ratio between the alcohol and carboxylic acid is adjusted as appropriate in conformity with the chemical structure of the desired wax. Considering, for example, the reactivity in the dehydration condensation reaction, the alcohol or carboxylic acid may be added in some excess from this ratio.

The mixture is then heated as appropriate to carry out the dehydration condensation reaction. A basic aqueous solution and a suitable organic solvent are added to the crude esterification product provided by the dehydration condensation reaction and the unreacted alcohol and carboxylic acid are deprotonated and separated into the aqueous phase. The target diester wax is then obtained by carrying out a water wash, distillative removal of the solvent, and filtration as appropriate.

There are no particular limitations on the binder resin that can be used by the toner, and resins known for use in toners can be used.

Specific examples are vinyl resins, styrene resins, styrenic copolymer resins, polyester resins, polyol resins, polyvinyl chloride resins, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins.

The following, for example, are preferred: styrenic copolymer resins, polyester resins, and hybrid resins provided by mixing a polyester resin with a vinyl resin or by partially reacting the two.

Viewed from the perspective of compatibility with the diester wax, polyester resins and vinyl resins are preferred among the preceding with polyester resins being more preferred.

The binder resin preferably includes a polyester resin, and from the viewpoint of low-temperature fixability, it is preferable that a polyester resin be a main component. The main component means that the amount thereof is 50% by mass to 100% by mass (preferably 80% by mass to 100% by mass). The binder resin is more preferably a polyester resin.

As a monomer to be used for the polyester resin, polyhydric alcohol (dihydric, trihydric or higher alcohol), polyvalent carboxylic acid (divalent, trivalent or higher carboxylic acid), acid anhydrides thereof or lower alkyl esters thereof are used.

The following polyhydric alcohol monomers can be used as a polyhydric alcohol monomer for the polyester unit of the polyester resin.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 6-hexanediol, neopentyl glycol, 2-ethyl-1,3-hexanediol, hydrogenated bisphenol A, bisphenol represented by formula (A) and derivatives thereof (A)

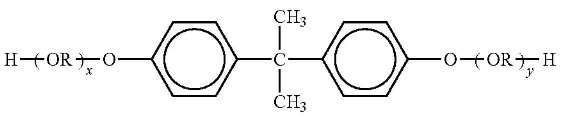

(in the formula, R is ethylene or propylene, x and y are each an integer of 0 or more, and the average value of x+y is from 0 to 10).

Diols represented by formula (B) can be mentioned.

(B)

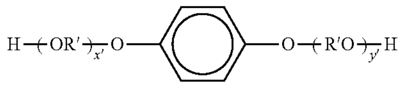

(In the formula, R' represents $—CH_2CH_2—$,

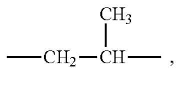

, or

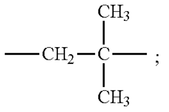

;

x' and y' are each integers greater than or equal to 0; and the average value of x'+y' is 0 to 10.)

Examples of the trivalent or higher alcohol component include sorbitol, 1,2,3,6-hexanetetrol, 1,4-sorbitan, pentaerythritol, dipentaerythritol, tripentaerythritol, and 1,2,4-butanetriol. 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Among these, glycerol, trimethylolpropane and pentaerythritol are preferably used. These dihydric alcohols and trihydric or higher alcohols may be used singly or in combination of a plurality thereof.

The following polyvalent carboxylic acid monomers can be used as a polyvalent carboxylic acid monomer used for the polyester unit of the polyester resin.

Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids, lower alkyl esters thereof and the like. Among these, maleic acid, fumaric acid, terephthalic acid and n-dodecenyl succinic acid are preferably used.

Examples of the trivalent or higher carboxylic acid, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof and lower alkyl esters thereof.

Among these, 1,2,4-benzenetricarboxylic acid, that is, trimellitic acid or a derivative thereof is particularly preferably used because it is inexpensive and the reaction control is easy. These divalent carboxylic acids and the like and trivalent or higher carboxylic acids can be used alone or in combination of a plurality thereof.

A method for producing the polyester resin is not particularly limited, and known methods can be used. For example, the above-mentioned alcohol monomer and carboxylic acid monomer are simultaneously charged and polymerized through an esterification reaction or a transesterification reaction and a condensation reaction to produce a polyester resin. The polymerization temperature is not particularly limited, but is preferably in the range of from 180° C. to 290° C. In the polymerization of the polyester resin, for example, a polymerization catalyst such as a titanium-based catalyst, a tin-based catalyst, zinc acetate, antimony trioxide, germanium dioxide or the like can be used. In particular, the binder resin is more preferably a polyester resin polymerized using a tin-based catalyst.

The partition coefficient of the binder resin may also be controlled. Using Bp for the partition coefficient of the binder resin, the difference (Wp−Bp) between the partition coefficient Wp of the diester wax and the partition coefficient Bp of the binder resin is preferably not more than 15.80. The compatibility between the binder resin and diester wax is increased when Wp−Bp is in the indicated range, and due to this the fixing performance is excellent.

Wp−Bp is more preferably not more than 15.60 and still more preferably not more than 14.00. The lower limit, while not particularly limited, is preferably at least 8.00 and more preferably at least 10.00.

Various known colorants can be used in the toner. When, in the case of black toner, a magnetic body is used, this has little effect on the behavior of the wax and the effects described above are readily achieved, and this is thus preferred.

An example of a toner production method is described in the following.

Various methods, e.g., pulverization, suspension polymerization, aggregation, and so forth, can be used to produce the toner core particle. Pulverization is preferred from the standpoints of convenience and material selection.

An example of the pulverization method is described in the following. First, the binder resin and diester wax and optional additives such as colorant, charge control agent, and so forth are mixed using a stirring device such as a Henschel mixer. The resulting mixture is then melt-kneaded, followed by coarse pulverization and fine pulverization and classification of the resulting pulverized material. A toner core particle having a desired particle diameter is thereby obtained.

A shell is then formed on the surface of the resulting toner core particle. The shell is formed, for example, by dispersing the shell-forming material in an aqueous medium and adsorbing this material to the toner core particle surface. The shell material may dissolve in the aqueous medium. In addition, a polar medium (for example, an alcohol such as methanol, ethanol, and so forth) may be mixed into the aqueous medium.

The entire surface of the core particle need not be coated by the shell, and portions may be present where the core particle is exposed.

Various materials, e.g., thermoplastic resins, thermosetting resins, silica fine particles, and so forth, can be used for the shell material. The main component is preferably thermosetting resin from the standpoint of being able to easily obtain the effects indicated above.

The thermosetting resin is preferably a urea resin or melamine resin.

A toner particle dispersion is obtained by the execution of these steps. A toner particle is then obtained as necessary by the execution of filtration, a drying step, and a classification step. The toner particle may also optionally be mixed with an external additive using a mixer (for example, an FM mixer from Nippon Coke & Engineering Co., Ltd.) in order to attach the external additive to the toner particle surface.

The elements and step sequence in this toner production method may each be freely altered in conformity to, e.g., the constitution and properties required of the toner.

The methods for measuring the individual properties are described in the following.

Method for Measuring the Melting Point of the Waxes 6 mg to 8 mg of the wax sample is measured into the sample holder, and the DSC curve is obtained by carrying out measurement using a differential scanning calorimeter (product name: RDC-220, Seiko Instruments Inc.) and a ramp-up condition of 10° C./min from −20° C. to 100° C. The top of the peak in this DSC curve is taken to be the melting point.

Volume-Average Particle Diameter Dv of the Toner Particle

The volume-average particle diameter Dv, number-average particle diameter Dn, and particle diameter distribution Dv/Dn of the toner particle is measured using a particle diameter analyzer (product name: Multisizer, Beckman Coulter, Inc.). Measurement with the Multisizer is performed using the following conditions: aperture diameter: 100 μm, dispersion medium: ISOTON II (product name), 10% concentration, number of particles measured: 100,000.

Specifically, 0.2 g of the toner particle sample is taken to a beaker and an aqueous alkylbenzenesulfonic acid solution (product name: DRIWEL, Fujifilm Corporation) is added to this as a dispersing agent. 2 mL of the dispersion medium is additionally added to wet the toner particle, after which 10 mL of the dispersion medium is added, dispersion is carried out for 1 minute using an ultrasound disperser, and the measurement is then performed using the aforementioned particle diameter analyzer.

Structural Analysis of the Toner Shell

Structural analysis of the toner shell can be performed using time-of-flight secondary ion mass spectroscopy (TOF-SIMS). The following instrument is used under the following conditions to identify the substructures from the fragment peaks for the toner shell.

measurement instrument: TRIFT-IV (product name, ULVAC-PHI, Incorporated)
primary ion: suitable selection from Bi and Au
raster size: 100 μm×100 μm
neutralization electron gun: used Compositional Analysis of the Wax The compositional analysis of the wax in the toner particle can be carried out using nuclear magnetic resonance ($^1$H-NMR, $^{13}$C-NMR). The instrument used is described in the following.

Each sample may be acquired by fractionation from the toner and may then be submitted to analysis.

Nuclear Magnetic Resonance Instrument ($^1$H-NMR, $^{13}$C-NMR)

Measurement instrument: JNM-EX400 FT-NMR instrument (JEOL Ltd.)
Measurement frequency: 400 MHz
Pulse condition: 5.0 μs
Frequency range: 10500 Hz
Number of scans: 64

EXAMPLES

The present invention is described in additional detail in the following using examples and comparative examples. The present invention is in no way limited to or by the examples that follow.

Unless specifically indicated otherwise, the "parts" in the description of the examples in the following is on a mass basis.

The ester waxes used in the examples are indicated in Table 1.

TABLE 1

| ester wax No. | wax name | wax structure | melting point | structure with reference to formula (A) R[1] | R[2], R[3] |
|---|---|---|---|---|---|
| 1 | ethylene glycol distearate | diester wax | 75.7° C. | 2 | 17 |
| 2 | 1,9-nonanediol dibehenate | diester wax | 75.0° C. | 9 | 21 |
| 3 | 1,9-nonanediol distearate | diester wax | 68.0° C. | 9 | 17 |
| 4 | 1,12-dodecanediol distearate | diester wax | 68.2° C. | 12 | 17 |
| 5 | 1,12-dodecanediol dipalmitate | diester wax | 63.0° C. | 12 | 15 |
| 6 | dibehenyl sebacate | diester wax | 73.3° C. | — | — |
| 7 | dibehenyl dodecanedioate | diester wax | 78.4° C. | — | — |
| 8 | pentaerythritol tetrastearate | tetraester | 78.6° C. | — | — |
| 9 | dipentaerythritol hexastearate | hexaester | 77.2° C. | — | — |

Toner 1 Production Example

Production of Polyester Resin 1

The following materials were mixed in a reactor fitted with a condenser, stirrer, and nitrogen introduction line.

polyoxypropylene (2.2)-2,2-bis (4-hydroxyphenyl) propane 58.0 parts ethylene glycol 8.0 parts terephthalic acid 31.0 parts trimellitic anhydride 3.0 parts dibutyltin oxide 0.3 parts The interior of the system was subjected to nitrogen substitution by a pressure-reduction process, after which heating was carried out to 210° C. and a reaction was run for 5 hours while introducing nitrogen and removing the produced water. Then, while continuing to stir, the temperature was gradually raised to 230° C. under reduced pressure, and a polyester resin 1 was synthesized by reaction for an additional 3 hours. The weight-average molecular weight Mw was 9,500, and Tg was 68° C.

Magnetic Body Production

92 L of an aqueous ferrous sulfate solution having an $Fe^{2+}$ concentration of 1.79 mol/L and 88 L of a 3.74 mol/L aqueous sodium hydroxide solution were combined and were mixed by stirring. The pH of this solution was 6.5.

While maintaining this solution at a temperature of 89° C. and a pH of 9 to 12, an oxidation reaction was run by injecting air at 20 L/min to produce core particles. At the point at which the ferrous hydroxide had been completely consumed, air injection was halted and the oxidation reaction was ended. The resulting magnetic body core particles were composed of magnetite and had an octahedral shape. The magnetic bodies had the shape of an octahedron, and the number-average particle diameter (D1) was 120 nm.

Toner Core Particle 1 Production

The following materials were thoroughly mixed using an FM mixer (Nippon Coke & Engineering Co., Ltd.), followed by melt-kneading using a twin-screw kneader (Ikegai Iron Works Corporation).

| | |
|---|---|
| polyester resin 1 | 100.0 parts |
| "Acrybase (registered trademark) FCA-201-PS" from Fujikura Kasei Co., Ltd. | 3.0 parts |
| HNP-9 (melting point: 76° C., Nippon Seiro Co., Ltd.) | 5.0 parts |
| wax 1 | 15.0 parts |
| magnetic body | 100.0 parts |

The resulting kneaded material was cooled and was coarsely pulverized to not more than 1 mm using a hammer mill to yield a coarse pulverizate.

A fine pulverizate of about 5 μm was then obtained from the resulting coarse pulverizate using a Turbo Mill from Turbo Kogyo Co., Ltd., followed by cutting the fines and coarse powder using a Coanda effect-based multi-grade classifier to obtain the toner core particle 1. Toner core particle 1 had a weight-average particle diameter (D4) of 6.8 μm and a Tg of 58° C.

Production of Toner Particle Dispersion 1

A reactor holding 300.0 parts of deionized water was held at 30° C., after which dilute hydrochloric acid was added to adjust the pH to 5.1. After the pH had been adjusted, the following material was introduced and dissolved to obtain an aqueous medium.

2.0 parts of Mirbane Resin SM-607 methylolmelamine aqueous solution (80% solids concentration, Showa Denko K. K.)

200.0 parts of toner core particle 1 was added to the aqueous medium and the reactor was stirred at a rate of 200 rpm, and the contents of the flask were stirred for 1 hour at a temperature of 40° C. An additional 90 parts of deionized water was then added to the flask; the temperature in the flask was raised to 70° C. while stirring the flask contents at 100 rpm; and the contents of the flask were stirred for 2 hours under conditions of a temperature of 70° C. and a rotation rate (stirring blade) of 100 rpm. This resulted in the production of a toner particle dispersion 1 in which toner particles having a shell layer formed on the surface of a core particle were dispersed.

Recovery of Toner Particle 1

Toner particle dispersion 1 was neutralized, cooled to normal temperature (approximately 25° C.), and filtered followed by redispersion in deionized water. Dispersion and washing were repeated until the electrical conductivity of the deionized water had been adequately reduced, to obtain a toner particle cake. This was then broken up and was thoroughly dried by residence for 70 hours in a 40° C. thermostat to obtain toner particle 1 in the form of a powder.

Toner 1 Production

Using an FM mixer ("FM-10B", Nippon Coke & Engineering Co., Ltd.), 100 parts of the toner particle was mixed for 5 minutes at a rotation rate condition of 3500 rpm with 1 part of hydrophobic silica particles (3-aminopropyltriethoxysilane and dimethylsilicone oil were used as the hydrophobic treatment agents).

The coarse particles were subsequently removed using a 300-mesh sieve (aperture=48 μm) to yield toner 1. Tables 2 and 3 gives the formulation and the obtained properties.

Toners 2 to 10 Production Example

Toners 2 to 10 were obtained proceeding as in the Toner 1 Production Example, but changing the type and amount of the ester wax as indicated in Table 2.

Toner 11 Production Example

Toner 11 was obtained proceeding as in the Toner 1 Production Example, but changing the type and amount of the ester wax as indicated in Table 2 and adjusting the pH of the aqueous medium in the Production of Toner Particle Dispersion 1 to 4.6.

Toner 12 Production Example

Toner 12 was obtained proceeding as in the Toner 1 Production Example, but changing the type and amount of the ester wax as indicated in Table 2 and adjusting the pH of the aqueous medium in the Production of Toner Particle Dispersion 1 to 5.7.

Toner 13 Production Example

Toner 13 was obtained proceeding as in the Toner 1 Production Example, but changing the type and amount of the ester wax as indicated in Table 2 and adjusting the pH of the aqueous medium in the Production of Toner Particle Dispersion 1 to 5.8.

Toner 14 Production Example

Toner 14 was obtained proceeding as in the Toner 13 Production Example, but adjusting the pH of the aqueous medium in the Production of Toner Particle Dispersion 1 to 4.0.

Toner 15 Production Example

Toner 15 was obtained proceeding as in the Toner 14 Production Example, but changing the type and amount of the ester wax as indicated in Table 2.

Toner 16 Production Example

Toner 16 was obtained proceeding as in the Toner 14 Production Example, but changing polyester resin 1 to the styrene-acrylic resin 1 produced by the following production method.

Production of Styrene-Acrylic Resin 1

The following materials were mixed in a reactor fitted with a condenser, stirrer, and nitrogen introduction line and were heated and held at 180° C. while stirring.

| | |
|---|---|
| styrene | 78.0 parts |
| n-butyl acrylate | 20.0 parts |
| acrylic acid | 2.0 parts |
| xylene | 300.0 parts |

A styrene-acrylic resin 1 was then synthesized by continuously adding 50.0 parts of a 2.0 mass % xylene solution of t-butyl hydroperoxide dropwise to the system over 4.5 hours and, after cooling, separating and removing the solvent. The weight-average molecular weight Mw was 14,500, and Tg was 65° C.

Toner 17 Production Example

Toner 17 was obtained proceeding as in the Toner 16 Production Example, but changing the type and amount of the ester wax as indicated in Table 2.

Toner 18 Production Example

Silane Compound Production 30 parts of isobutyltrimethoxysilane was added dropwise while stirring into 70 parts of deionized water. This aqueous solution was then held at a pH of 5.5 and a temperature of 55° C. and a hydrolysis was run by dispersing for 120 minutes at a peripheral velocity of 0.46 m/s using a disper impeller. The hydrolysis reaction was then stopped by bringing the pH of the aqueous solution to 7.0 and cooling to 10° C. This yielded a silane compound-containing aqueous solution 1.

Production of Hydrophobed Magnetic Body 100 parts of the magnetic body was introduced into a high-speed mixer (Model LFS-2 from Fukae Powtec Corporation) and 8.0 parts of the silane compound-containing aqueous solution 1 was added dropwise over 2 minutes while stirring at a rotation rate of 2000 rpm. This was followed by mixing and stirring for 5 minutes.

Then, in order to raise the adherence of the silane compound, drying was carried out for 1 hour at 40° C. and, after the moisture had been reduced, the mixture was dried for 3 hours at 110° C. to develop the condensation reaction of the silane compound. This was followed by crushing and passage through a screen having an aperture of 100 μm to obtain a hydrophobed magnetic body 1.

An aqueous medium containing a dispersion stabilizer was obtained by introducing 450 parts of a 0.1 mol/L aqueous $Na_3PO_4$ solution into 720 parts of deionized water and heating to 60° C. and then adding 67.7 parts of a 1.0 mol/L aqueous $CaCl_2$ solution.

| | |
|---|---|
| styrene | 76.0 parts |
| n-butyl acrylate | 24.0 parts |
| divinylbenzene | 0.2 parts |
| hydrophobed magnetic body 1 | 90.0 parts |
| amorphous saturated polyester resin | 3.0 parts |

(amorphous saturated polyester resin provided by the condensation reaction of terephthalic acid with an ethylene oxide and propylene oxide adduct on bisphenol A, Mw=9500, acid value=6 mg KOH/g)

These materials were dispersed and mixed to uniformity using an attritor (Nippon Coke & Engineering Co., Ltd.) to provide a monomer composition. This monomer composition was heated to 63° C. and 3 parts of ester wax 7 and 5 parts of HNP-9 (Nippon Seiro Co., Ltd.) were mixed into this with dissolution.

This monomer composition was introduced into the aforementioned aqueous medium, and granulation was carried out by stirring for 10 minutes at 12000 rpm with a T. K. Homomixer (Tokushu Kika Kogyo Co., Ltd.) at 60° C. under an $N_2$ atmosphere. Then, while stirring with a paddle impeller, 8.0 parts of the polymerization initiator t-butyl peroxypivalate was introduced, the temperature was raised to 70° C., and a reaction was run for 4 hours. This was followed by cooling to room temperature to obtain a toner particle dispersion 18.

The following samples were then weighed into a reactor and mixed using a propeller impeller.

toner particle dispersion 18: 500.0 parts

Mirbane Resin SM-607 methylolmelamine aqueous solution (80% solids concentration): 0.6 parts The temperature of the mixture was then brought to 30° C. and holding was subsequently carried out for 1.0 hour while mixing at 200 rpm using a propeller impeller. Then, while stirring with the propeller impeller, the temperature was raised to 80° C. at a rate of 1° C./minute and holding was carried out for 2 hours. This was followed by adjusting the pH of the resulting mixture to 7.0 using a 1 mol/L aqueous NaOH solution. The temperature of the contents was thereafter cooled to normal temperature (approximately 25° C.); the pH was then adjusted to 1.5 with 1 mol/L hydrochloric acid and stirring was carried out for 1.0 hour; and filtration while washing with deionized water, drying, and removal of the fines and coarse powder with a wind force classifier then yielded a toner particle 18.

Using an FM mixer ("FM-10B", Nippon Coke & Engineering Co., Ltd.), 100 parts of the toner particle 18 was mixed for 5 minutes at a rotation rate condition of 3500 rpm with 1 part of hydrophobic silica particles (3-aminopropyltriethoxysilane and dimethylsilicone oil were used as the hydrophobic treatment agents).

The coarse particles were subsequently removed using a 300-mesh sieve (aperture of 48 μm) to yield toner 18. Table 2 gives the formulation and properties.

Toner 19 Production Example

Toner 19 was obtained proceeding as for toner 1, except that, in the Production of Toner Particle Dispersion 1, the pH adjustment was not performed, the methylolmelamine was not used, and shell formation was carried out with adjustment of the temperature and pH as appropriate using the following resin fine particle dispersion 1. The amount of addition of the resin fine particle dispersion was an amount that provided a dispersion of the full amount of the toner particle.

Production of Resin Fine Particle Dispersion 1

30 parts of acetone was introduced into a reactor fitted with a condenser, stirrer, thermometer, and nitrogen introduction line and was stirred.

| | |
|---|---|
| methyl 2-acrylamidophenylsulfonate | 15.0 parts |
| styrene | 68.8 parts |
| n-butyl acrylate | 15.0 parts |
| acrylic acid | 1.2 parts |

These materials were introduced into the reactor and were dissolved. The interior of the reactor was heated to 60° C., followed by the addition of 2.0 parts of 2,2-azobis(2,4-dimethylvaleronitrile) as polymerization initiator and reaction for 8 hours. The reaction solution was cooled followed by condensation and drying using an evaporator and additional drying for 10 hours at 40° C. in a vacuum dryer to obtain a resin.

The obtained resin was redissolved in acetone with adjustment to provide a solids ratio of 75 mass %. Emulsification was then carried out by dropwise addition into 100 parts of deionized water while stirring, and the acetone was distilled off under a reduced pressure of 100 mmHg in the reactor. Dilution was performed to a solids ratio of 15 mass % to yield resin fine particle dispersion 1.

Toner 20 Production Example

A toner 20 was obtained proceeding as in the Toner 19 Production Example, but using the following PMMA particle dispersion in place of the resin fine particle dispersion 1.

Production of PMMA Particle Dispersion

PMMA (polymethyl methacrylate) particles (MP-1451, Soken Chemical & Engineering Co., Ltd., Tg=128° C.): 70 parts anionic surfactant (Neogen RK, Dai-ichi Kogyo Seiyaku Co., Ltd.): 30 parts deionized water: 200 parts These materials were mixed and were dispersed for 10 minutes using a high-output ultrasound homogenizer (VCX-750). Deionized water was added to bring the solids fraction in the dispersion to 20 mass % and yield a PMMA particle dispersion in which PMMA particles having a volume-average particle diameter of 150 nm were dispersed.

Toner 21 Production Example

A toner particle 21 was obtained by adjusting the pH of the toner particle dispersion 18 in the Toner 18 Production Example to 1.5 using hydrochloric acid and stirring for 1.0 hours, followed by filtration while washing with distilled water, drying, and removal of the fines and coarse powder using a wind force classifier. Observation and analysis of the surface of the toner particle 21 indicated that a shell had been formed by polyester resin.

Using an FM mixer ("FM-10B", Nippon Coke & Engineering Co., Ltd.), 100 parts of the toner particle 21 was mixed for 5 minutes at a rotation rate condition of 3500 rpm with 1 part of hydrophobic silica particles (3-aminopropyltriethoxysilane and dimethylsilicone oil were used as the hydrophobic treatment agents).

The coarse particles were subsequently removed using a 300-mesh sieve (aperture of 48 μm) to yield toner 21. Table 2 gives the formulation and properties.

Toners 22 and 23 Production Example

Toners 22 and 23 were obtained proceeding as in the Toner 14 Production Example, but changing the type and amount of the wax as indicated in Table 2.

Examples 1 to 18 and Comparative Examples 1 to 5

Evaluation 1: Evaluation of Fixing Film Contamination

The fixing film contamination was evaluated using an HL-5470DW (Brother Industries, Ltd.). 50 prints were continuously output in a normal-temperature, normal-humidity environment of a solid black image, followed immediately by the output of 3 solid white prints; the degree of contamination of the solid white was scored.

When a high print percentage image, such as a solid black image, is fixed, to some extent the toner may not separate from the fixing film and may attach to the fixing film and be carried around. When a solid white image is printed immediately after this, the toner on the fixing film transfers to the paper and is then visualized as contamination on the paper. The image was observed with an optical microscope and evaluation was carried out using the following criteria. The results of the evaluation are given in Table 3. Scores of A to C were regarded as satisfactory.

A: Contamination is not present.

B: Contamination is present, but is only punctiform contamination.

C: Contamination is present; minor contamination is present at two or more locations.

D: Contamination is present; minor contamination occurs over the entire surface, or distinct and immediately perceptible contamination is seen.

Evaluation 2: Evaluation of Discharged Paper Sticking

The evaluation of discharged paper sticking was carried out using an HL-5470DW (Brother Industries, Ltd.); 100 duplex prints of the charts in the FIGURE were made in a high-temperature, high-humidity environment (temperature of 32.5° C., humidity of 80%). When standing is carried out in a condition in which the solid black areas and character areas are in contact with one another and discharged paper sticking occurs, toner-to-toner adhesion occurs and missing character portions and blank dots in the solid black areas are produced. Using the criteria given below, the prints were evaluated after standing for 10 minutes in the discharged paper tray. The results of the evaluations are given in Table 3. Scores of A to D were regarded as satisfactory.

A: There are no deficiencies in the solid areas and no deficiencies in the characters.

B: There are character deficiencies and/or minor punctiform deficiencies in the solid areas. Images with deficiencies occur in a total of not more than 5 prints.

C: There are character deficiencies and/or minor punctiform deficiencies in the solid areas. Images with deficiencies occur in a total of 6 to 10 prints.

D: There are character deficiencies and/or minor punctiform deficiencies in the solid areas. Images with deficiencies occur in a total of 11 to 15 prints.

E: There are character deficiencies and distinct punctiform and line-form deficiencies in the solid areas.

Evaluation 3: Evaluation of the Fixation Temperature Region (Fixing Performance)

The low-temperature fixability was evaluated using an external fixing unit provided by removing the fixing unit of an HL-5470DW (Brother Industries, Ltd.) and modifying it to enable the temperature of the fixing unit to be freely set and to provide a process speed of 400 mm/sec.

Using this apparatus, an unfixed image with a toner laid-on level per unit area set to 1.0 mg/cm$^2$ was passed through the temperature-adjustable fixing unit. "Plover Bond" paper (105 g/m$^2$, Fox River Paper Company) was used as the recording medium.

The fixing performance was evaluated using the width of the temperature region in which fixing could be performed. The low temperature-side fixable temperature was scored based on the appearance of cold offset, which occurs when the solid image presents punctiform white drop out. The high temperature-side fixable temperature was evaluated based on the appearance of hot offset, which occurs when repetitive contamination occurs in non-image areas at a pitch conforming to the film diameter in the fixing unit. The results of the evaluation are given in Table 3. Scores of A to D were regarded as satisfactory.

A: the width of the fixable region is at least 30° C.

B: the width of the fixable region is at least 25° C., but less than 30° C.

C: the width of the fixable region is at least 20° C., but less than 25° C.

D: the width of the fixable region is at least 15° C., but less than 20° C.

E: the width of the fixable region is less than 15° C.

TABLE 2

| toner No. | Sp | Wp | Wp-Sp | Wp-Bp | insoluble matter in the shell | shell type | wax No. | resin | amount of addition of ester wax (parts) | type of binder resin |
|---|---|---|---|---|---|---|---|---|---|---|
| 1 | −0.01 | 16.23 | 16.24 | 10.97 | 70% | thermosetting | wax | 1 | 15 | polyester |
| 2 | −0.01 | 16.23 | 16.24 | 10.97 | 70% | thermosetting | wax | 1 | 20 | polyester |
| 3 | −0.01 | 18.61 | 18.62 | 13.35 | 70% | thermosetting | wax | 2 | 20 | polyester |
| 4 | −0.01 | 18.24 | 18.23 | 12.97 | 70% | thermosetting | wax | 3 | 20 | polyester |
| 5 | −0.01 | 19.78 | 19.79 | 14.52 | 70% | thermosetting | wax | 4 | 20 | polyester |
| 6 | −0.01 | 19.38 | 19.37 | 14.12 | 70% | thermosetting | wax | 5 | 20 | polyester |
| 7 | −0.01 | 18.45 | 18.46 | 13.19 | 70% | thermosetting | wax | 6 | 20 | polyester |
| 8 | −0.01 | 18.45 | 18.46 | 13.19 | 70% | thermosetting | wax | 6 | 25 | polyester |
| 9 | −0.01 | 18.45 | 18.46 | 13.19 | 70% | thermosetting | wax | 6 | 5 | polyester |
| 10 | −0.01 | 18.45 | 18.46 | 13.19 | 70% | thermosetting | wax | 6 | 3 | polyester |
| 11 | −0.01 | 18.45 | 18.46 | 13.19 | 90% | thermosetting | wax | 6 | 3 | polyester |
| 12 | −0.01 | 18.45 | 18.46 | 13.19 | 10% | thermosetting | wax | 6 | 3 | polyester |
| 13 | −0.01 | 18.45 | 18.46 | 13.19 | 5% | thermosetting | wax | 6 | 3 | polyester |
| 14 | −0.01 | 18.45 | 18.46 | 13.19 | 100% | thermosetting | wax | 6 | 3 | polyester |
| 15 | −0.01 | 19.23 | 19.24 | 13.97 | 100% | thermosetting | wax | 7 | 3 | polyester |
| 16 | −0.01 | 18.45 | 18.46 | 15.64 | 100% | thermosetting | wax | 6 | 3 | styrene-acrylic |
| 17 | −0.01 | 19.23 | 19.24 | 16.42 | 100% | thermosetting | wax | 7 | 3 | styrene-acrylic |
| 18 | −0.01 | 19.23 | 19.24 | 16.42 | 100% | thermosetting | wax | 7 | 3 | styrene-acrylic |
| 19 | 0.43 | 16.23 | 15.80 | 10.97 | 0% | thermoplastic | wax | 1 | 15 | polyester |
| 20 | 0.81 | 16.23 | 15.42 | 10.97 | 0% | thermoplastic | wax | 1 | 15 | polyester |
| 21 | 5.26 | 19.23 | 13.97 | 16.42 | 0% | thermoplastic | wax | 7 | 3 | styrene-acrylic |
| 22 | −0.01 | 33.30 | 33.31 | 28.04 | 100% | thermosetting | wax | 8 | 15 | polyester |
| 23 | −0.01 | 50.00 | 50.01 | 44.74 | 100% | thermosetting | wax | 9 | 15 | polyester |

In the table, the "insoluble matter in the shell" indicates the content (mass %) in the shell of matter insoluble in tetrahydrofuran.

TABLE 3

| | fixing film contami-nation | dis-charged paper sticking | fixation temperature region |
|---|---|---|---|
| Example 1 | A | A | A |
| Example 2 | A | A | A |
| Example 3 | B | A | A |
| Example 4 | B | A | A |
| Example 5 | B | A | A |
| Example 6 | B | B | A |
| Example 7 | B | B | A |
| Example 8 | B | B | B |
| Example 9 | B | B | B |
| Example 10 | B | B | B |
| Example 11 | B | B | B |
| Example 12 | B | B | B |
| Example 13 | C | B | B |
| Example 14 | C | B | C |
| Example 15 | C | B | C |
| Example 16 | C | C | C |
| Example 17 | C | C | D |
| Example 18 | C | D | D |
| Comparative Example 1 | D | E | B |
| Comparative Example 2 | D | E | B |
| Comparative Example 3 | D | E | B |
| Comparative Example 4 | C | C | E |
| Comparative Example 5 | C | C | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125110, filed Jul. 22, 2020, which is hereby incorporated by reference herein in its entirety.

What is claimed is:

1. A toner, comprising:

a toner particle comprising a core particle with a shell on the surface thereof;

the core particle comprising a binder resin, a diester wax and a paraffin wax;

the diester wax being represented by

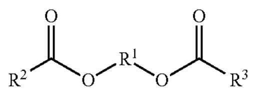

when $R^1$ is an alkylene group having 2 to 12 carbons, and $R^2$ and $R^3$ are independently a straight-chain alkyl group having 16 to 22 carbons; and 5 to 80 mass % of the shell being insoluble in tetrahydrofuran, wherein $$Sp \leq 0.40 \text{ and } 16.00 \leq Wp - Sp \leq 20.00$$

when Sp is a partition coefficient of the shell and Wp is a partition coefficient of the diester wax, the binder resin comprises 80 to 100% by mass polyester resin, and a content of the paraffin wax is 1 to 20 mass parts per 100 mass parts of the binder resin.

2. The toner according to claim 1, wherein the shell comprises a thermosetting resin.

3. The toner according to claim 2, wherein the thermosetting resin is at least one member selected from the group consisting of melamine resin and urea resin.

4. The toner according to claim 1, wherein the diester wax is an ester of a diol and a monocarboxylic acid.

5. The toner according to claim 1, wherein $R^1$ is an alkylene group having 2 carbons.

6. The toner according to claim 1, wherein the content of the diester wax is 4 to 25 mass parts based on 100 mass parts of the binder resin.

7. The toner according to claim 1, wherein, the difference (Wp−Bp) between Wp and Bp is not more than 15.80, where Bp is a partition coefficient of the binder resin.

8. The toner according to claim 1, wherein 10 to 80 mass % of the shell is matter that is insoluble in tetrahydrofuran.

9. The toner according to claim 1, wherein 50 to 80 mass % of the shell is matter that is insoluble in tetrahydrofuran.

10. The toner according to claim 1, wherein the toner particle contains a magnetic body as a colorant.

11. The toner according to claim 1, wherein the toner contains hydrophobic silica particles treated by 3-aminopropyltriethoxysilane and dimethylsilicone oil, as an external additive.

* * * * *